US012087144B2

(12) United States Patent
Katz et al.

(10) Patent No.: US 12,087,144 B2
(45) Date of Patent: Sep. 10, 2024

(54) DEVICE AND METHOD FOR DETERMINING A STATUS OF A PERSON

(71) Applicant: Essence Smartcare Ltd., Herzlia Pituach (IL)

(72) Inventors: Barak Katz, Petach Tikva (IL); Yechezkel Alon Biran, Tel Aviv-Jaffa (IL); Ohad Amir, Herzliya (IL); Jonathan Mark Schnapp, Tel Aviv (IL); Eliav Bar Shimon, Ganei-Tikva (IL)

(73) Assignee: Essence Smartcare Ltd., Herzlia Pituach (IL)

( * ) Notice: Subject to any disclaimer, the term of this patent is extended or adjusted under 35 U.S.C. 154(b) by 0 days.

(21) Appl. No.: 17/926,961

(22) PCT Filed: May 21, 2021

(86) PCT No.: PCT/IL2021/050591
§ 371 (c)(1),
(2) Date: Nov. 21, 2022

(87) PCT Pub. No.: WO2021/234712
PCT Pub. Date: Nov. 25, 2021

(65) Prior Publication Data

US 2023/0196897 A1 Jun. 22, 2023

(30) Foreign Application Priority Data

May 21, 2020 (GB) ..................................... 2007587

(51) Int. Cl.

| | |
|---|---|
| ***G08B 21/04*** | (2006.01) |
| ***G08B 7/06*** | (2006.01) |
| ***G08B 25/12*** | (2006.01) |

(52) U.S. Cl.
CPC ........... *G08B 21/0492* (2013.01); *G08B 7/06* (2013.01); *G08B 21/043* (2013.01); *G08B 21/0469* (2013.01); *G08B 25/12* (2013.01)

(58) Field of Classification Search
CPC .................................................. G08B 21/0492
See application file for complete search history.

(56) References Cited

U.S. PATENT DOCUMENTS

| | | | |
|---|---|---|---|
| 4,882,567 | A | 11/1989 | Johnson |
| 7,567,200 | B1 | 7/2009 | Osterweil |

(Continued)

FOREIGN PATENT DOCUMENTS

| | | | |
|---|---|---|---|
| CN | 1670780 | A | 9/2005 |
| CN | 108806190 | A | 11/2018 |

(Continued)

OTHER PUBLICATIONS

Foreign Communication from a Related Counterpart Application, International Search Report and Written Opinion dated Sep. 17, 2021, International Application No. PCT/IL2021/050591 filed on May 21, 2021.

(Continued)

*Primary Examiner* — Travis R Hunnings
(74) *Attorney, Agent, or Firm* — Conley Rose P.C.

(57) ABSTRACT

Embodiments relate to a device for mounting on a wall for monitoring an environment. In one embodiment the device comprises: a body comprising: an active reflected wave detector; and a processor coupled to the active reflected wave detector, the processor configured to: control the active reflected wave detector to measure wave reflections from the environment to accrue measured wave reflection data, and identify a status of a person in the environment based on the measured wave reflection data, wherein the processor assumes, for said identification, that the active reflected (Continued)

wave detector is at an operating height above a floor of the environment. The device comprises a cord extending from the body, the cord having a length for ending at the floor when the device is mounted with the active reflected wave detector at said operating height and the cord is freely hanging and straight.

20 Claims, 4 Drawing Sheets

(56) References Cited

U.S. PATENT DOCUMENTS

| | | | |
|---|---|---|---|
| 7,893,844 B2 | 2/2011 | Gottlieb | |
| 7,916,066 B1 | 3/2011 | Osterweil | |
| 8,009,021 B1 | 8/2011 | Peters, Jr. et al. | |
| 8,044,772 B1* | 10/2011 | Roe | B60K 28/06 340/576 |
| 8,068,051 B1 | 11/2011 | Osterweil | |
| 8,115,641 B1 | 2/2012 | Dempsey | |
| 10,380,860 B2 | 8/2019 | Amir et al. | |
| 2005/0024208 A1 | 2/2005 | Maki et al. | |
| 2006/0145874 A1 | 7/2006 | Fredriksson et al. | |
| 2011/0032139 A1 | 2/2011 | Benitez et al. | |
| 2012/0116252 A1* | 5/2012 | Newman | A61B 5/1117 600/587 |
| 2013/0041856 A1 | 2/2013 | Benitez et al. | |
| 2013/0082842 A1 | 4/2013 | Balazs et al. | |
| 2014/0145848 A1 | 5/2014 | Amir | |
| 2014/0155729 A1 | 6/2014 | Saitoh | |
| 2014/0362213 A1 | 12/2014 | Tseng | |
| 2015/0213702 A1* | 7/2015 | Kimmel | G06V 20/52 382/103 |
| 2016/0267327 A1 | 9/2016 | Franz et al. | |
| 2016/0377704 A1 | 12/2016 | Harash et al. | |
| 2017/0074980 A1 | 3/2017 | Adib et al. | |
| 2017/0169691 A1 | 6/2017 | Kirenko et al. | |
| 2017/0328995 A1 | 11/2017 | Marschalkowski et al. | |
| 2018/0070889 A1 | 3/2018 | Lee et al. | |
| 2018/0192919 A1 | 7/2018 | Nakayama et al. | |
| 2018/0330593 A1 | 11/2018 | Zack et al. | |
| 2019/0108740 A1 | 4/2019 | Coke et al. | |
| 2019/0108913 A1 | 4/2019 | Coke et al. | |
| 2019/0110741 A1 | 4/2019 | Ishii et al. | |
| 2019/0142120 A1* | 5/2019 | AlGhazi | G08B 21/0461 135/66 |
| 2019/0313948 A1 | 10/2019 | Matsunaga et al. | |
| 2020/0116824 A1 | 4/2020 | Yang et al. | |
| 2022/0283292 A1* | 9/2022 | Dvash | A61B 5/1113 |
| 2023/0039666 A1* | 2/2023 | Hevdeli | G01P 13/00 |
| 2023/0042452 A1* | 2/2023 | Amir | G01S 13/56 |
| 2023/0055654 A1* | 2/2023 | Amir | G01S 7/412 |

FOREIGN PATENT DOCUMENTS

| | | | |
|---|---|---|---|
| CN | 109239706 | A | 1/2019 |
| CN | 109765552 | A | 5/2019 |
| CN | 110179471 | A | 8/2019 |
| CN | 110703241 | A | 1/2020 |
| CN | 111166342 | A | 5/2020 |
| CN | 112363160 | A | 2/2021 |
| EP | 0367402 | A1 | 5/1990 |
| EP | 2533219 | A1 | 12/2012 |
| EP | 2875500 | A1 | 5/2015 |
| JP | 2006153878 | A | 6/2006 |
| JP | 2008220250 | A | 9/2008 |
| JP | 2015082265 | A | 4/2015 |
| WO | 2016155789 | A1 | 10/2016 |
| WO | 2016193972 | A2 | 12/2016 |
| WO | 2019070570 | A1 | 4/2019 |
| WO | 2019231861 | A1 | 12/2019 |
| WO | 2021118570 | A1 | 6/2021 |
| WO | 2021137215 | A1 | 7/2021 |
| WO | 2021137220 | A2 | 7/2021 |
| WO | 2021137227 | A2 | 7/2021 |
| WO | 2021234712 | A1 | 11/2021 |

OTHER PUBLICATIONS

Foreign Communication from a Related Counterpart Application, International Preliminary Report on Patentability dated Nov. 17, 2022, International Application No. PCT/IL2021/050591 filed on May 21, 2021.

Foreign Communication from a Related Counterpart Application, International Search Report and Written Opinion dated Jun. 28, 2021, International Application No. PCT/IL2020/051345 filed on Dec. 29, 2020.

Foreign Communication from a Related Counterpart Application, International Search Report and Written Opinion dated Aug. 3, 2021, International Application No. PCT/IL2020/051353 filed on Dec. 30, 2020.

Foreign Communication from a Related Counterpart Application, International Combined Search and Examination Report dated Sep. 13, 2021, Great Britain Application No. 2110780.0 filed on Jul. 27, 2021.

Foreign Communication from a Related Counterpart Application, Examination Report dated Oct. 29, 2021, Great Britain Application No. 2110780.0 filed on Jul. 27, 2021.

Foreign Communication from a Related Counterpart Application, International Combined Search and Examination Report dated Jun. 23, 2020, Great Britain Application No. 1919446.3 filed on Dec. 31, 2019.

Foreign Communication from a Related Counterpart Application, International Preliminary Report on Patentability dated Jul. 5, 2022, International Application No. PCT/IL2020/051353 filed on Dec. 30, 2020.

Foreign Communication from a Related Counterpart Application, International Combined Search and Examination Report dated Jun. 23, 2020, Great Britain Application No. 1919449.7 filed on Dec. 31, 2019.

Foreign Communication from a Related Counterpart Application, International Preliminary Report on Patentability dated Jul. 5, 2022, International Application No. PCT/IL2020/051345 filed on Dec. 29, 2020.

Foreign Communication from a Related Counterpart Application, International Combined Search and Examination Report dated Jun. 25, 2020, Great Britain Application No. 1919450.5 filed on Dec. 31, 2019.

Hevdeli, Ilan , et al., "Active Reflected Wave Monitoring," filed Jun. 30, 2022, U.S. Appl. No. 17/790,495.

Amir, Ohad, et al., "State Detection," filed Jun. 30, 2022, U.S. Appl. No. 17/790,491.

Ohad Amir, "A Device for Monitoring an Environment," filed Jun. 30, 2022, U.S. Appl. No. 17/790,494.

Foreign Communication From a Related Counterpart Application, International Search Report and Written Opinion dated Apr. 16, 2021, International Application No. PCT/IL2020/051336 filed on Dec. 28, 2020.

Foreign Communication From a Related Counterpart Application, International Preliminary Report on Patentability dated Jul. 5, 2022, International Application No. PCT/IL2020/051336 filed on Dec. 28, 2020.

* cited by examiner

DEVICE AND METHOD FOR DETERMINING A STATUS OF A PERSON

CROSS-REFERENCE TO RELATED APPLICATIONS

The present application is a filing under 35 U.S.C. 371 as the National Stage of International Application No. PCT/IL2021/050591, filed May 21, 2021, entitled "A DEVICE AND METHOD FOR DETERMINING A STATUS OF A PERSON," which claims priority to United Kingdom Application No. 2007587.5 filed with the Intellectual Property Office of The United Kingdom on May 21, 2020, both of which are incorporated herein by reference in their entirety for all purposes.

TECHNICAL FIELD

The present invention relates generally to a device for determining a status of a person in an environment. In some embodiments, the device is more specifically a fall detector.

BACKGROUND

There is a need to use a monitoring system to automatically detect a status of a person in a designated space, for example in an interior of a building. For example, an elderly person may end up in a hazardous situation in which they are unable to call for help, or unable to do so quickly. One such situation may be if they have fallen.

Some known systems have been developed in which the person wears a pendant which has an accelerometer in it to detect a fall based on kinematics. The pendant upon detecting a fall can transmit an alert signal. However the person may not want to wear, or may be in any case not wearing, the pendant.

SUMMARY

According to one aspect of the present disclosure there is provided a device for mounting on a wall for monitoring an environment, comprising:

a body comprising:

an active reflected wave detector; and a processor coupled to the active reflected wave detector, the processor configured to:

control the active reflected wave detector to measure wave reflections from the environment to accrue measured wave reflection data, and identify a status of a person in the environment based on the measured wave reflection data, wherein the processor assumes, for said identification, that the active reflected wave detector is at an operating height above a floor of the environment; and a cord extending from said body of the device, the cord having a length for ending at the floor when the device is mounted with the active reflected wave detector at said operating height and the cord is freely hanging and straight.

When the device is mounted with the active reflected wave detector at said operating height a distal end of the cord may be in contact with, but not deformed by, the floor.

The processor may be configured to detect pulling of said cord and generate an alert in response to the detected pulling.

The processor may be configured to output said alert to one or more of: an audio output device of said device; a visual output device of said device; or a communications interface of said device for transmission of said alert to a remote device.

Preferably, the cord extends from an underside of the body.

The length of the cord may be between 1.8 m and 3 m, preferably between 1.8 and 2.5 m, more preferably between 1.8 and 2.3 m.

The device may further comprise a motion detector having a field of view, the active reflected wave detector having a field of view.

In some implementations, when mounted to the wall and the cord is freely hanging, the cord has a distal end that is in a region of the environment that is outside at least one of the field of view of the motion detector and the field of view of the active reflected wave detector.

In some implementations, when mounted to the wall and the cord is freely hanging, the cord has a distal end that is in a region of the environment that is outside both of the field of view of the motion detector and the field of view of the active reflected wave detector.

The cord may be accessible to a person at least partly in the region. The cord may be accessible to a person that is entirely in the region.

The field of view of the motion detector and the field of view of the active reflected wave detector may be at least partially overlapping one another.

At least one boundary of the field of view of the active reflected wave detector may extend more vertically downwards than a lower boundary of the field of view of the motion detector. Preferably, the motion detector is a passive infrared detector.

In some implementations, the active reflected wave detector has a field of view, wherein when mounted to the wall and the cord is freely hanging, the cord has a distal end that is in a region of the environment that is outside the field of view of the active reflected wave detector.

The processor may be configured to identify a status of the person in the environment by determining that the person is in a fall position or a non-fall position.

According to another aspect of the present disclosure there is provided a device for mounting on a wall for monitoring an environment, comprising: a body comprising:

an active reflected wave detector having a field of view; and a processor coupled to the active reflected wave detector, the processor configured to:

control the active reflected wave detector to measure wave reflections from the environment to accrue measured wave reflection data, and identify a fall status of the person based on the measured wave reflection data; and a cord extending from said body, wherein when the device is mounted to the wall and the cord is freely hanging, the cord has a distal end that is in a region of the environment that is outside the field of view of the active reflected wave detector;

wherein the processor is configured to detect pulling of said cord and generate an alert in response to the detected pulling.

The processor may be configured to output said alert to one or more of: an audio output device of said device; a visual output device of said device; or a communications interface of said device for transmission of said alert to a remote device.

Preferably, the cord extends from an underside of the body.

In some implementations, the length of the cord is between 1.5 m and 2.5 m.

In some implementations, the processor assumes, for said identification, that the active reflected wave detector is at an operating height above a floor of the environment, and the cord has a length for ending within 50 cm from the floor when the device is mounted with the active reflected wave detector at said operating height and the cord is freely hanging and straight.

When the device is mounted with the active reflected wave detector at said operating height the distal end of the cord may be in contact with, but not deformed by, the floor.

In some implementations, the cord is reachable by a person who is beneath the cord and whose one or more of pelvis, torso and knees is on the floor.

Preferably, the device further comprises a motion detector having a field of view.

In some implementations, when mounted to the wall and the cord is freely hanging, the distal end of the cord is in a region of the environment that is outside both of the field of view of the motion detector and the field of view of the active reflected wave detector.

The cord may be accessible to a person at least partly in the region. The cord may be accessible to a person that is entirely in the region.

In some implementations, the field of view of the motion detector and the field of view of the active reflected wave detector are at least partially overlapping one another.

At least one boundary of the field of view of the active reflected wave detector may extend more vertically downwards than a lower boundary of the field of view of the motion detector. The motion detector may be a passive infrared detector.

According to another aspect of the present disclosure there is provided a device for mounting on a wall for monitoring an environment, comprising:

a body comprising:

an active reflected wave detector; and a processor coupled to the active reflected wave detector, the processor configured to:

- control the active reflected wave detector to measure wave reflections from the environment to accrue measured wave reflection data, and
- identify a fall status of the person based on the measured wave reflection data; and a chord extending from said body, wherein the processor is configured to detect pulling of said cord and generate an alert in response to the detected pulling.

In some implementations, the active reflected wave detector has a field of view, wherein when the body is mounted to the wall and the chord is freely hanging, the chord has a distal end that is in a region of the environment that is outside the field of view of the active reflected wave detector.

The chord may be reachable by a person who is beneath the chord and whose one or more of pelvis, torso and knees is on the floor.

The chord may be reachable by a person who is beneath the chord and whose one or more of pelvis or torso is on the floor.

The chord may be reachable by a person who is beneath the chord and whose torso is on the floor.

In some implementations, the chord has a length between 1.5 and 2.5 meters, preferably between 1.8 and 2.5 meters.

The embodiments of any one of the aspects of the invention descried herein are applicable to any of the other aspects of the invention.

These and other aspects will be apparent from the embodiments described in the following.

The scope of the present disclosure is not intended to be limited by this summary nor to implementations that necessarily solve any or all of the disadvantages noted.

BRIEF DESCRIPTION OF THE SEVERAL VIEWS OF THE DRAWINGS

For a better understanding of the present disclosure and to show how embodiments may be put into effect, reference is made to the accompanying drawings in which.

DETAILED DESCRIPTION

Figure 1:
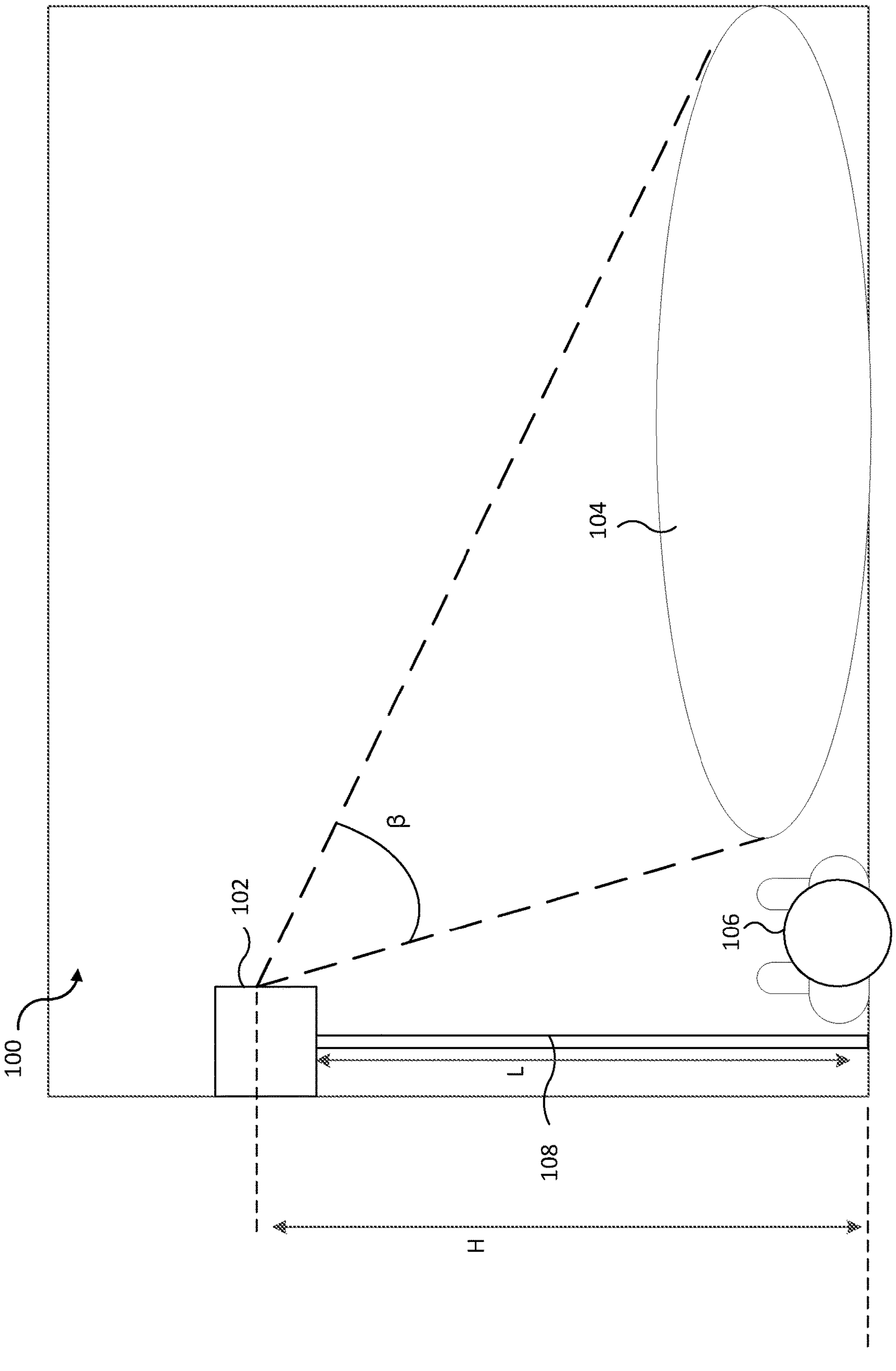
FIG. 1 illustrates an environment in which a device has been positioned according to a first embodiment of the present disclosure.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents. In the following embodiments, like components are labelled with like reference numerals.

In the following embodiments, the term data store or memory is intended to encompass any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., EEPROM, solid state drives, random-access memory (RAM), etc.), and/or the like.

As used herein, except wherein the context requires otherwise, the terms "comprises", "includes", "has" and grammatical variants of these terms, are not intended to be exhaustive. They are intended to allow for the possibility of further additives, components, integers or steps.

The functions or algorithms described herein are implemented in hardware, software or a combination of software and hardware in one or more embodiments. The software comprises computer executable instructions stored on computer readable carrier media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor.

Specific embodiments will now be described with reference to the drawings.

FIG. 1 illustrates an environment 100 in which a device 102 has been positioned. The environment 100 may for example be an indoor space such as a room of a home, a nursing home, a public building or other indoor space. Alternatively the environment may be an outdoor space such as a garden. The device 102 is configured to monitor a space 104 in the environment 100 in which a person 106 may be present.

The device 102 can be used to detect when a person 106 has fallen, or at least being in a fall position (e.g. lying on the floor), which is illustrated in FIG. 1.

Figure 2:
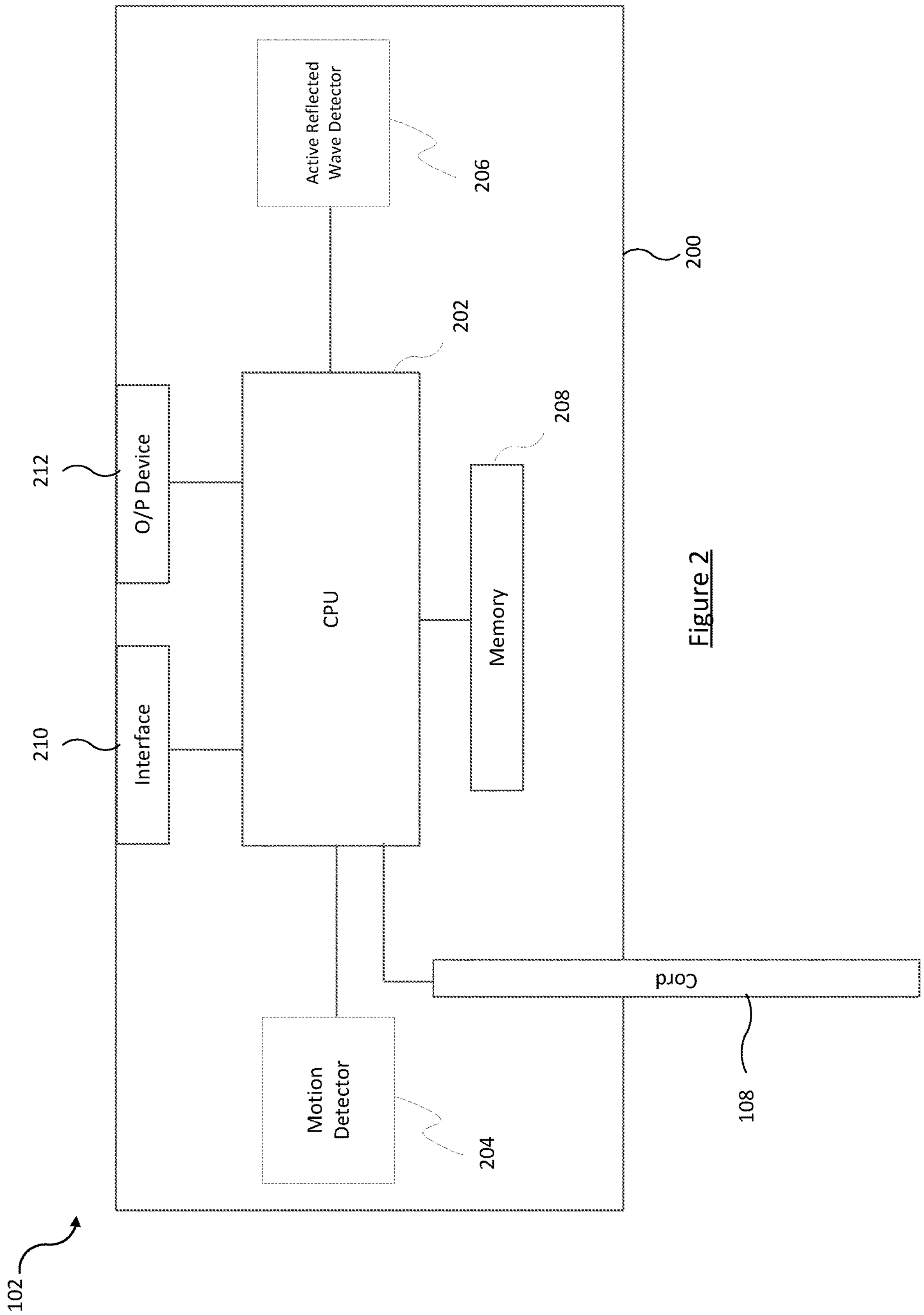
FIG. 2 is a schematic block diagram of the device.

FIG. 2 illustrates a simplified view of the device 102. A shown in FIG. 2, the device 102 comprises a body 200 (e.g. a housing) which houses a plurality of components. As shown in FIG. 2, the body 200 houses a central processing unit ("CPU") 202, to which is connected a memory 208. The functionality of the CPU 202 described herein may be implemented in code (software) stored on a memory (e.g. memory 208) comprising one or more storage media, and arranged for execution on a processor comprising on or more processing units. The storage media may be integrated into and/or separate from the CPU 202. The code is configured so as when fetched from the memory and executed on the processor to perform operations in line with embodiments discussed herein. Alternatively it is not excluded that some or all of the functionality of the CPU 202 is implemented in dedicated hardware circuitry, or configurable hardware circuitry like an FPGA, for example. In other embodiments (not shown) the processor that executes the processing steps described herein may be comprised of distributed processing devices.

As shown in FIG. 2 the body 200 also houses an active reflected wave detector 206 which is connected to CPU 202. The active reflected wave detector 206 measures wave reflections from the environment. The active reflected wave detector 206 may operate in accordance with one of various reflected wave technologies.

Preferably, the active reflected wave detector 206 is a radar sensor. The radar sensor 206 may use millimeter wave (mmWave) sensing technology. The radar is, in some embodiments, a continuous-wave radar, such as frequency modulated continuous wave (FMCW) technology. Such a chip with such technology may be, for example, Texas Instruments Inc. part number IWR6843. The radar may operate in microwave frequencies, e.g. in some embodiments a carrier wave in the range of 1-100 GHz (76-81 Ghz or 57-64 GHz in some embodiments), and/or radio waves in the 300 MHz to 300 GHz range, and/or millimeter waves in the 30 GHz to 300 GHz range. In some embodiments, the radar has a bandwidth of at least 1 GHz. The active reflected wave detector 206 may comprise antennas for both emitting waves and for receiving reflections of the emitted waves, and in some embodiments different antennas may be used for the emitting compared with the receiving.

The active reflected wave detector 206 is not limited to being a radar sensor, and in other embodiments, the active reflected wave detector 206 is a lidar sensor, or a sonar sensor.

The active reflected wave detector 206 being a radar sensor is advantageous over other reflected wave technologies in that radar signals can transmit through some materials, e.g. wood or plastic, but not others—notably water which is important because humans are mostly water. This means that the radar can potentially "see" a person in the environment 100 even if they are behind such an object. This is not the case for sonar.

In operation, the CPU 202 uses the output of the active reflected wave detector 206 to identify a status of a person in the environment based on the measured wave reflection data. For example, the CPU 202 may identify that a person detected in the environment is in a fall position or a non-fall position (i.e. a fall status).

The CPU 202 may be able to provide further detail on the non-fall position for example, the CPU 202 may be identify that the person is in a state from one or more of: a free-standing state (e.g. they are walking); a safe supported state which may be a reclined safe supported state whereby they are likely to be safely resting (e.g. a state in which they are in an elevated lying down position, or in some embodiments this may additionally encompass being in a sitting position on an item of furniture); and a standing safe supported state (e.g. they are standing and leaning on a wall). The CPU 202 may be able to identify the person as crawling, which may be regarded as a fall state or a non-fall state (given that if the person has fallen the person is still able to move so may be regarded as less critical) dependent on how the CPU 202 is configured.

In embodiments of the present disclosure, the active reflected wave detector 206 e.g. a radar sensor, is controlled by the CPU 202 to perform one or more reflected wave measurements.

Figure 3A:
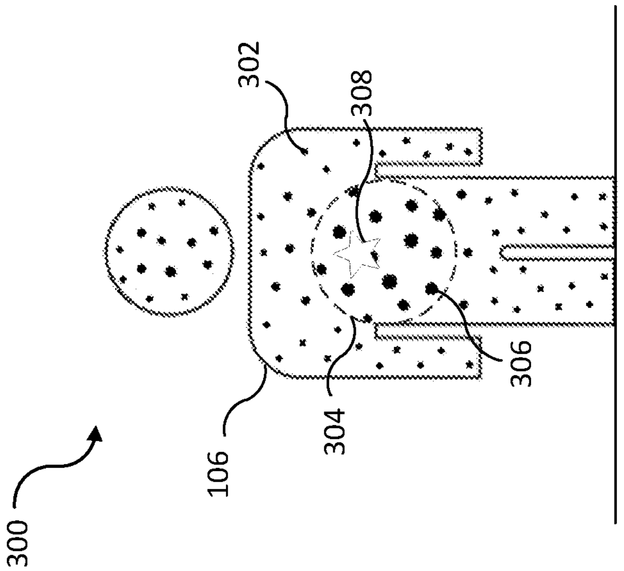
FIGS. 3*a* and 3*b* illustrates a human body with indications of reflections measured by an active reflected wave detector when the person is in a standing non-fall state and in a fall state.

FIG. 3*a* illustrates a free-standing human body 106 with indications of reflective wave reflections therefrom in accordance with embodiments.

For each reflected wave measurement, the reflected wave measurement may include a set of one or more measurement points that make up a "point cloud", the measurement points representing reflections from respective reflection points from the environment. In embodiments, the active reflected wave detector 206 provides an output to the CPU 202 for each captured frame as a point cloud for that frame. Each point 302 in the point cloud may be defined by a 3-dimensional spatial position from which a reflection was received, and defining a peak reflection value, and a doppler value from that spatial position. Thus, a measurement received from a reflective object may be defined by a single point, or a cluster of points from different positions on the object, depending on its size.

In some embodiments, such as in the examples described herein, the point cloud represents only reflections from moving points of reflection, for example based on reflections from a moving target. That is, the measurement points that make up the point cloud represent reflections from respective moving reflection points in the environment. This may be achieved for example by the active reflected wave detector 206 using moving target indication (MTI). Thus, in these embodiments there must be a moving object in order for there to be reflected wave measurements from the active reflected wave detector (i.e. measured wave reflection data), other than noise. The minimum velocity required for a point of reflection to be represented in the point cloud is less for lower frame rates. Alternatively, the CPU 202 receives a point cloud from the active reflected wave detector 206 for each frame, where the point cloud has not had pre-filtering out of reflections from moving points. Preferably for such embodiments, the CPU 202 filters the received point cloud to remove points having Doppler frequencies below a threshold to thereby obtain a point cloud representing reflections only from moving reflection points. In both of these implementations, the CPU 202 accrues measured wave reflection data which corresponds to one or more point clouds for respective frame(s) whereby each point cloud represents reflections only from moving reflection points in the environment.

In other embodiments, no moving target indication (or any filtering) is used. In these implementations, the CPU 202 accrues measured wave reflection data which corresponds to one or more point clouds for respective frame(s) whereby each point cloud can represent reflections from both static and moving reflection points in the environment.

In operation, the CPU 202 uses the accrued measured wave reflection data to identify a status of a person in the environment whereby the accrued measured wave reflection data corresponds to (i) a point cloud of a single frame or (ii) multiple point clouds of a plurality of time sequential frames.

FIG. 3*a* illustrates a map of reflections. The size of the point represents the intensity (magnitude) of energy level of the radar reflections (see larger point 306). Different parts or portions of the body reflect the emitted signal (e.g. radar) differently. For example, generally, reflections from areas of the torso 304 are stronger than reflections from the limbs. Each point represents coordinates within a bounding shape for each portion of the body. Each portion can be separately considered and have separate boundaries, e.g. the torso and the head may be designated as different portions. The point cloud can be used as the basis for a calculation of a reference parameter or set of parameters which can be stored instead of or in conjunction with the point cloud data for a reference object (human) for comparison with a parameter or set of parameters derived or calculated from a point cloud for radar detections from an object (human).

When a cluster of measurement points are received from an object in the environment 100, a location of a particular part/point on the object or a portion of the object, e.g. its centre, may be determined by the CPU 202 from the cluster of measurement point positions having regard to the intensity or magnitude of the reflections (e.g. a centre location comprising an average of the locations of the reflections weighted by their intensity or magnitude). As illustrated in FIG. 3*a*, the reference body has a point cloud from which its centre has been calculated and represented by the location 308, represented by the star shape. In this embodiment, the torso 304 of the body is separately identified from the body and the centre of that portion of the body is indicated. In alternative embodiments, the body can be treated as a whole or a centre can be determined for each of more than one body part e.g. the torso and the head, for separate comparisons with centres of corresponding portions of a scanned body.

In operation, the CPU 202 processes the accrued measured wave reflection data to identify a status of a person in the environment.

For example, the 3D positions from which reflected waves are reflected from a person may be compared with reference data sets, respectively representative of various statuses, to classify which status the 3D positions of the reflected waves are, as a whole, most closely correlated.

At least some of the different reference data sets may be distinguishable from each other based on heights of the respective 3D positions with respect to the floor, especially to identify when the person is in a fall position. Optionally, a velocity associated with the person may also be determined from the reflected waves, and used to assist in classifying any velocity dependent statuses.

In another example, it may be assumed the person is lying on the floor and therefore in a fall position if the 3D positions are all below some height with respect to the floor, or in yet another example if the 3D position of the torso or head is below some height threshold. If they remain in such a position for a threshold amount of time, it may be concluded that they have fallen. Referring back to FIG. 2, the device 102 also comprises a cord 108 which extends externally from the body 200.

FIG. 2 shows the cord 108 being coupled to the CPU 202 to illustrate that the CPU 202 may be arranged to detect pulling of the cord and generate an alert based on the detected pulling, the alert indicating that a person is in need of assistance, for example because they have fallen. That is, in some embodiments the cord operates as a pull-cord for panic/distress detection.

However as described in detail below, in some embodiments the cord 108 being coupled to the CPU 202 is optional in that the cord 108 may be used merely as a tool for positioning the device 102 such that the active reflected wave detector 206 is at its operating height and the cord does not operate as a pull-cord for panic/distress detection. Whilst FIG. 2 shows the body 200 housing a portion of the cord, this is not essential, in some implementations the body 200 does not house a portion of the cord 108.

The body 200 may house an output device 212 for outputting an alert generated by the CPU 202. The output device 212 may comprise an audio output device (e.g. a speaker) to output an audible alert. Additionally or alternatively, the output device 212 comprises a visual output device (e.g. one or more lights or a display).

The body 200 may house a communications interface 210 for outputting an alert generated by the CPU 202 to a remote device. The communications interface 210 may be a wired or wireless communications interface. This remote device may for example be a mobile computing device (e.g. a tablet or smartphone) associated with a carer or relative. Alternatively the remote device may be a computing device in a remote location (e.g. a personal computer in a monitoring station).

Alternatively the remote device may be a control hub in the environment 100 (e.g. a wall or table mounted control hub). The control hub may be a control hub of a system that may be monitoring system and/or may be a home automation system. The notification to the control hub is in some embodiments via wireless personal area network. A first embodiment of the present disclosure is now described with reference to FIG. 1.

As noted above, the CPU 202 uses the output of the active reflected wave detector 206 to identify a status of a person in the environment based on the measured wave reflection data. In the first embodiment, in order to perform this identification reliably and accurately, the CPU 202 assumes, for this identification, that the active reflected wave detector is at a particular operating height, H, above the floor of the environment.

In the first embodiment, the cord 108 has a length, L, for ending at the floor when the device 102 is mounted on a wall with the active reflected wave detector 206 at the operating height and the cord is freely hanging and straight.

This advantageously simplifies the design of the device 102 because a user input interface for a user to inform the CPU 202 of the height of the active reflected wave detector 206 is not required. Furthermore this reduces complexity of the CPU 202 operation because it does not need to adapt its processing algorithm (used to process accrued measured wave reflection data) to account for different heights of the active reflected wave detector 206 when the device is mounted at different heights by installers.

As shown in FIG. 1, the cord 108 may extend from an underside of the body 200. Alternatively the cord 108 may extend from a sidewall of the body.

When the device 102 is mounted on a wall such that the active reflected wave detector 206 is at its operating height with the cord freely hanging and straight (across its entire length from the body 200 to a distal end of the cord) the distal end of the cord is in contact with, but not deformed by, the floor. That is, the cord has a length such that it just touches the ground when the active reflected wave detector 206 is at its operating height required for installation. It will be appreciated that the installer of the device 102 may be instructed to have the distal end of the cord 108 just touching floor, or within a predetermined small distance (e.g. within 1 cm or 2 cm) from the floor, especially if the small distance is easily judged by the eye (e.g. to within 1 cm), as this may still enable the CPU 202 to perform identification of a status of a person in the environment with sufficient accuracy.

Thus in the first embodiment, the cord 108 functions as a measurement tool for positioning the device 102 such that the active reflected wave detector 206 is at its operating height, H. In particular, an installer can determine an operating height of the active reflected wave detector by placing the device above a floor of the environment such that a cord extending from said body of the device ends at said floor when the cord is freely hanging and straight, and then mount the device to a wall of the environment such that the active reflected wave detector is at the operating height.

The length of the cord (measured from a proximal end where the cord extends from the body 200 of the device 102 to a distal end of the cord) is between 1.8 m and 3 m. This length is preferably between 1.8 and 2.5 m to suit all indoor environments, since even low ceilings tend to be at least 2.5 m high or close to it. Generally, though it is more convenient to mount the device at more easily accessible heights, like 2.1 m meters, for example, so the length may be 2.1 m. Similar mounting heights may call for a cord length that is between 1.8 and 2.3 m.

As noted above, the cord 108 may additionally function as a pull-cord. In these implementations, if a person pulls the cord 108 the CPU 202 is arranged to detect the pulling of the cord and generate an alert based on the detected pulling, the alert indicating that a person is in need of assistance (for example because they have fallen). In these implementations the cord 108 is coupled to the CPU 202. The alert may be output via one or more of the mechanisms described above.

As shown in FIG. 1, the active reflected wave detector 206 has a field of view (as denoted by the angle (3). When mounted to the wall and the cord is freely hanging, the distal end of the cord 108 may be in a region of the environment that is outside the field of view of the active reflected wave detector. Thus, as shown in FIG. 1, if the person if the active reflected wave detector 206 does not detect that a person has fallen (for example due to the fact that the person is not in the field of view of the active reflected wave detector 206), then the person can pull the cord to raise an alert provided they are under or can get to be under the active reflected wave detector 206. In this scenario, when pulling the cord 108 one or more of the person's pelvis, torso and knees is on the floor.

In other words, the provision of the end of the pull chord in a region of the environment that is outside the field of view of the active reflected wave detector extends an effective usability region of the device 102 for responding to fall situations.

In a variation on this embodiment, the end of the pull chord may lie within a region of the environment that is inside the field of view of the active reflected wave detector, but provides a backup mechanism for a person to trigger an alert in an event that their fall was not detected by the device 102. In some embodiments, the device 102 is configured to provide an indication in response to detecting a fall based on the active reflective wave detector 206. A failure of the device 102 to trigger an alert may therefore be known by the person by virtue of the device 102 not providing an audio and/or visual indication that it has detected a fall.

A second embodiment of the present disclosure is now described with reference to FIG. 4.

In the second embodiment, the cord 108 is a pull cord in that if a person pulls the cord 108 the CPU 202 is arranged to detect the pulling of the cord and generate an alert based on the detected pulling, the alert indicating that a person is in need of assistance (for example because they have fallen). That is, the cord 108 is coupled to the CPU 202. The alert may be output via one or more of the mechanisms described above.

Figure 4:
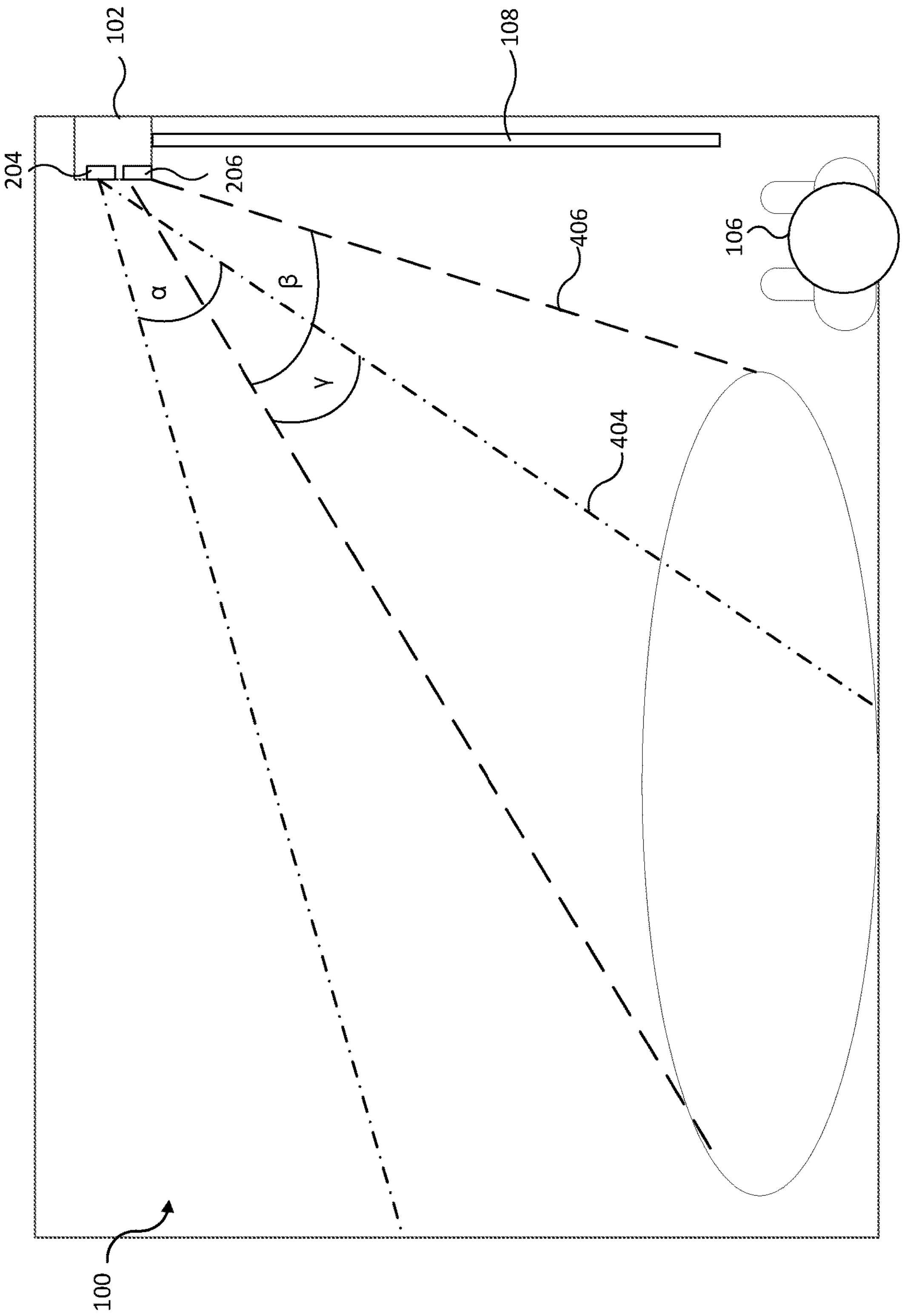
FIG. 4 illustrates an environment in which a device has been positioned according to a second embodiment of the present disclosure.

As shown in FIG. 4, the cord 108 extends from the body 200 and when the device is mounted to the wall and the cord 108 is freely hanging, the cord 108 has a distal end that is in a region of the environment that is outside the field of view of the active reflected wave detector 206. This advantageously ensures that if the active reflected wave detector 206 does not detect that a person has fallen (for example due to the fact that the person is not in the field of view of the active reflected wave detector 206), then the person can pull the cord to raise an alert provided they are under or can get to be under the active reflected wave detector 206. In this scenario, when pulling the cord 108 one or more of the person's pelvis, torso and knees is on the floor. The cord 108 therefore has to have sufficient length for the person to reach it. In the second embodiment, the length of the cord (measured from a proximal end where the cord extends from the body 200 of the device 102 to a distal end of the cord) may be between 1.5 m and 2.5 m. Thus the cord 108 extends the range in which the device 102 can detect a person in distress in the environment.

As noted above, the CPU 202 uses the output of the active reflected wave detector 206 to identify a status of a person in the environment based on the measured wave reflection data. In the second embodiment, in order to perform this identification reliably and accurately, the CPU 202 may assume, for this identification, that the active reflected wave detector is at a particular operating height, H, above the floor of the environment.

When the device 102 is mounted on a wall such that the active reflected wave detector 206 is at its operating height with the cord freely hanging and straight (across its entire length from the body 200 to a distal end of the cord) the distal end of the cord may be in contact with, but not deformed by, the floor. That is, like in the first embodiment, in the second embodiment the cord may have a length such that it just touches the ground when the active reflected wave detector 206 is at its operating height required for installation. Thus in the second embodiment, in addition to functioning as a pull cord, the cord 108 may additionally function as a measurement tool for positioning the device 102 such that the active reflected wave detector 206 is at its operating height, H.

As shown in FIG. 4, the cord 108 may extend from an underside of the body 200. Alternatively the cord 108 may extend from a sidewall of the body.

FIG. 4 additionally illustrates the device 102 comprising a motion detector 204, this is optional as will be described in more detail below.

Figure 3B:
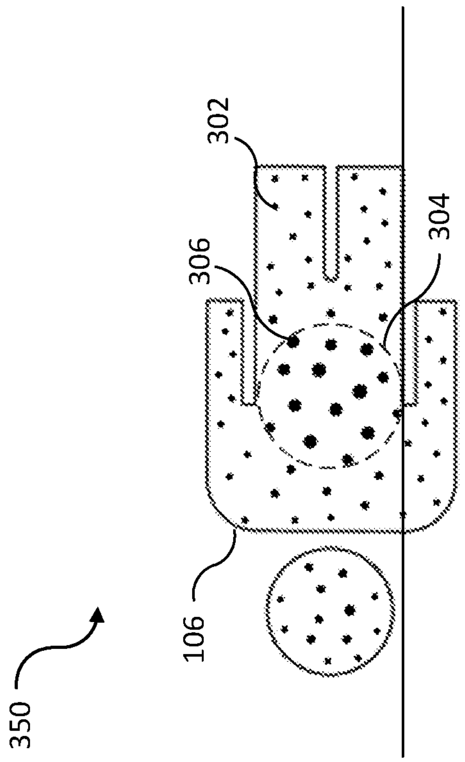

In both the first and second embodiments described above the CPU 202 may be coupled to a motion detector 204 (however in a variation, the motion detector 204 may not be present). This is shown for example in FIG. 3. The below discussion of the motion detector is relevant to both the first and second embodiments described above.

While in FIG. 2, the motion detector 204 and reflected wave detector are separate from the CPU 202, in other implementations, at least part of processing aspects of the motion detector 204 and/or active reflected wave detector 206 may be provided by a processor that also provides the CPU 202, and resources of the processor may be shared to provide the functions of the CPU 202 and the processing aspects motion detector 204 and/or active reflected wave detector 206.

Similarly, functions of the CPU 202, such as those described herein, may be performed in the motion detector 204 and/or the active reflected wave detector 206. In implementations, where the device 102 comprises the motion detector 204, the active reflected wave detector 206 may consume more power in an activated state (i.e. when turned on and operational) than the motion detector 204 does when in an activated state.

Due to the power consumption of the active reflected wave detector 206, the active reflected wave detector 206 can be controlled by the CPU 202 to switch from a deactivated state to an activated state in response to the motion detector 204 detecting motion, to save power.

In the deactivated state the active reflected wave detector 206 may be turned off. Alternatively, in the deactivated state the active reflected wave detector 206 may be turned on but in a low power consumption operating mode whereby the active reflected wave detector 206 is not operable to perform reflected wave measurements. In the activated state the active reflected wave detector 206 is operable to measure wave reflections from the environment.

The active reflected wave detector 206 consumes more power in an activated state (i.e. when turned on and operational) than the motion detector 204 in an activated state. Thus some embodiments described herein may use a relatively low power consuming motion detector 204 (e.g. a PIR detector) to determine whether there is movement in a monitored space 104 of the environment 100, and only if the motion detector 204 detects motion is the active reflected wave detector 206 activated to identify a status of a person in the environment. This advantageously provides significant power saving benefits.

In implementations where the device 102 comprises the motion detector 204, as shown in FIG. 2 the body 200 may house both the motion detector 204 and the active reflected wave detector 206. Alternatively, the motion detector 204 may be external to the device 102 and be coupled to the CPU 202 by way of a wired or wireless connection. Further, the outputs of the motion detector 204 may be wirelessly received from an intermediary device that relays, manipulates and/or in part produces their outputs, for example a control hub of a monitoring and/or home automation system, which may in some cases comprise a security system.

The CPU 202 is configured to receive an indication of a detected motion in the monitored space 104 based on an output of the motion detector 204. The motion detector is preferably a Passive Infrared (PIR) detector, however it could be an active reflected wave sensor, for example radar, that detects motion based on the Doppler effect. For example, the motion detector 204 may be a radar based motion detector which detects motion based on the Doppler component of a radar signal, such as from active reflected wave detector 206. In implementations where device 102 comprises a motion detector 204 that is distinct from the active reflected wave detector 206), the motion detector 204 has a field of view (as denoted by the angle α as shown for example in FIG. 4). The motion detector 204 and the active reflected wave detector 206 may be arranged such the field of view α of the motion detector 204 and the field of view β of the active reflected wave detector 206 overlap, as shown by angle γ in FIG. 4. The fields of view of the motion detector 204 and the active reflected wave detector 206 may partially or fully overlap.

The overlapping, or partial overlapping, of the fields of view is, in some embodiments, in the 3D sense. However in other embodiments the overlapping, or partial overlapping, of the fields of view may be in a 2D, plan view, sense. For example there may be an overlapping field of view in the X and Y axes, but with a non-overlap in the Z axis.

In some implementations the motion detector 204 may have a vertical field of view limited to heights above a predefined height threshold (e.g. 70 cm) above the floor level, so as to avoid triggering by pets. In these embodiments, the active reflected wave detector 206 on the other hand would have a field of view that includes heights below this height threshold, e.g. between the threshold and the floor level, to be able to detect the person when they are close to the floor—which is a situation that means they may have fallen. In some embodiments the field of view of the active reflected wave detector 206 also includes heights above the height threshold so as to assist in any reflected-wave measurements of the person when the person is standing. In some implementations, the active reflected wave detector 206 is used to determine whether the person is in a posture that may be relate to them having fallen. This may be achieved for example by detecting a height associated with a certain location on their body, e.g. a location above their legs.

The active reflected wave detector 206 may have a field of view that includes heights below such height threshold, over a horizontal area on interest, e.g. at least between the threshold and the floor level, to be able to detect the person when they are close to the floor—which is a situation that means they may have fallen. In some implementations the field of view of the active reflected wave detector 206 also includes heights above the height threshold so as to assist in any reflected-wave measurements of the person when the person is standing. Furthermore, the active reflective wave detector 206 may be arranged to have a field of view (or at least a lower bound 406 of the field of view) that extends more vertically downwardly than the motion detector 204. That is, the lower bound 406 of the field of view of the active reflected wave detector 206 may be angled more vertically downward than the lower bound 404 of the field of view of the motion detector 204.

In the first embodiment described above, in implementations whereby the CPU 202 is coupled to a motion detector 204, when mounted to the wall and the cord 108 is freely hanging, the distal end of the cord 108 may be in a region of the environment that is outside at least one of the field of view of the motion detector 204 and the field of view of the active reflected wave detector 206. That is the distal end of the cord 108 may be in a region of the environment that is outside (i) the field of view of the motion detector 204, (ii) the field of view of the active reflected wave detector 206, or (iii) field of view of both the motion detector 204 and the field of view of the active reflected wave detector 206. In this scenario, when pulling the cord 108 one or more of the person's pelvis, torso and knees is on the floor.

In the second embodiment described above, in implementations whereby the CPU 202 is coupled to a motion detector 202, when mounted to the wall and the cord 108 is freely hanging, the distal end of the cord 108 may be in a region of the environment that is outside the field of view of the motion detector 204 in addition to being outside the field of view of the active reflected wave detector 206.

However, optimal operation of the device 102 may be compromised even if the person is a region that is within the field of view of the active reflected wave detector 206, if the person is outside the the field of view of the motion detector 204. In such a position however, such as for the case where the lower bound 406 of the field of view of the active reflected wave detector 206 is angled more vertically downward than the lower bound 404 of the field of view of the motion detector 204, it is advantageous if the person can reach the chord 108 to pull it. Thus, in some implementations when mounted to the wall and the cord 108 is freely hanging, the distal end of the cord 108 may be in a region of the environment that is outside the field of view of at least the motion detector 204. That is, the distal end of the chord 108 may be inside or outside the field of view of the active reflected wave detector 206.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device for mounting on a wall for monitoring an environment, comprising:
- a body comprising:
  - an active reflected wave detector; and
- a processor coupled to the active reflected wave detector, the processor configured to:
- control the active reflected wave detector to measure wave reflections from the environment to accrue measured wave reflection data, and identify a fall status of a person based on the measured wave reflection data; and
  - a cord extending from said body, wherein the processor is configured to detect pulling of said cord and generate an alert in response to the detected pulling.

2. The device according to claim 1 wherein:
- the active reflected wave detector has a field of view, wherein when the body is mounted to the wall and the cord is freely hanging, the cord has a distal end that is in a region of the environment that is outside the field of view of the active reflected wave detector.

3. The device according to claim 1, wherein the cord is reachable by a person who is beneath the cord and whose one or more of pelvis, torso and knees is on the floor.

4. The device according to claim 1, wherein the cord is reachable by a person who is beneath the cord and whose one or more of pelvis or torso is on the floor.

5. The device according to claim 1, wherein the cord is reachable by a person who is beneath the cord and whose torso is on the floor.

6. The device according to claim 1, wherein the active reflected wave detector is a radar sensor.

7. The device according to claim 1, wherein the active reflected wave detector is a sonar sensor.

8. A method of installing a device in an environment, the device comprising: an active reflected wave detector; and a processor coupled to the active reflected wave detector, the processor configured to: control the active reflected wave detector to measure wave reflections from the environment to accrue measured wave reflection data, and identify a status of a person in the environment based on the measured wave reflection data; the method comprising:
- determining an operating height of the active reflected wave detector by placing the device above a floor of the environment such that a cord extending from said body of the device ends at said floor when the cord is freely hanging and straight, wherein the processor assumes, for said identification, that the active reflected wave detector is at said operating height above the floor; and
- mounting the device to a wall of the environment such that the active reflected wave detector is at said operating height.

9. The device according to claim 1, wherein the cord has a length between 1.8 and 2.3 meters.

10. The device according to claim 1, wherein the processor is configured to output said alert to one or more of:
- an audio output device of said device; or
- a visual output device of said device.

11. The device according to claim 1, wherein the processor is configured to output said alert to a communications interface of said device for transmission of said alert to a remote device.

12. The device according to claim 1, wherein the cord extends from an underside of the body.

13. The device according to claim 1, wherein the processor assumes, for said identification, that the active reflected wave detector is at an operating height above a floor of the environment, and wherein the cord has a length for ending within 50 cm from the floor when the device is mounted with the active reflected wave detector at said operating height and the cord is freely hanging and straight.

14. The device according to claim 2, the device further comprising a motion detector having a field of view, wherein when mounted to the wall and the cord is freely hanging, the distal end of the cord is in a region of the environment that is also outside of the field of view of the motion detector.

15. The device according to claim 14, wherein the motion detector is a passive infrared detector.

16. The device according to claim 2, the device further comprising a motion detector having a field of view, wherein the field of view of the motion detector and the field of view of the active reflected wave detector are at least partially overlapping one another.

17. The device according to claim 16, wherein at least one boundary of the field of view of the active reflected wave detector extends more vertically downwards than a lower boundary of the field of view of the motion detector.

18. The device according to claim 16, wherein the motion detector is a passive infrared detector.

19. The device according to claim 1, wherein the processor is configured to identify the status of the person in the environment by determining that the person is in a fall position or a non-fall position.

20. The device according to claim 1, wherein the processor assumes, for said identification, that the active reflected wave detector is at an operating height above a floor of the environment, wherein the cord has a length for ending at the floor when the device is mounted with the active reflected wave detector at said operating height and the cord is freely hanging and straight, and wherein when the device is mounted with the active reflected wave detector at said operating height a distal end of the cord is in contact with, but not deformed by, the floor.

* * * * *